Figure 1:
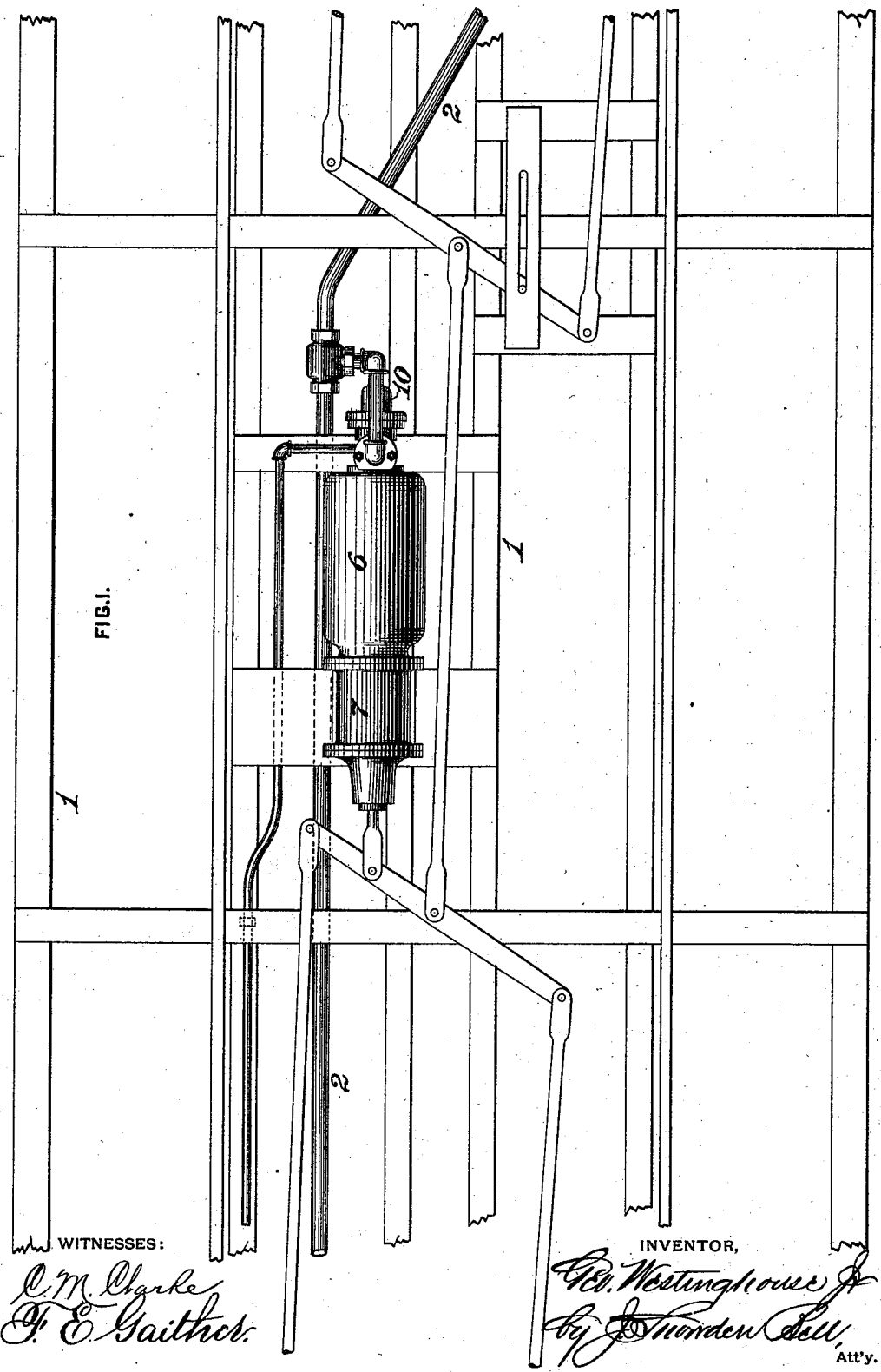

(No Model.) 4 Sheets—Sheet 1.

G. WESTINGHOUSE, Jr.
FLUID PRESSURE AUTOMATIC BRAKE MECHANISM.

No. 376,837. Patented Jan. 24, 1888.

WITNESSES: INVENTOR,

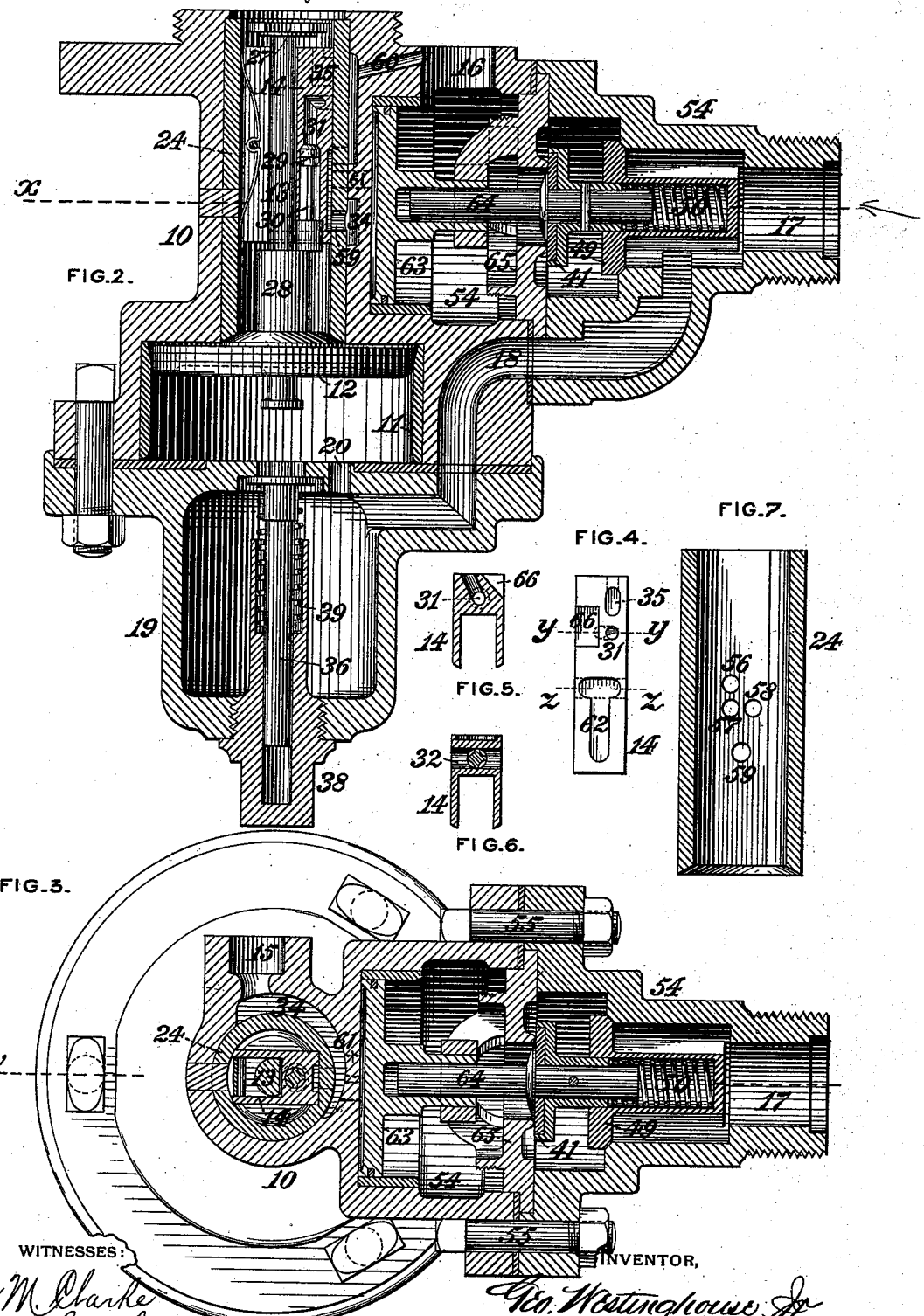

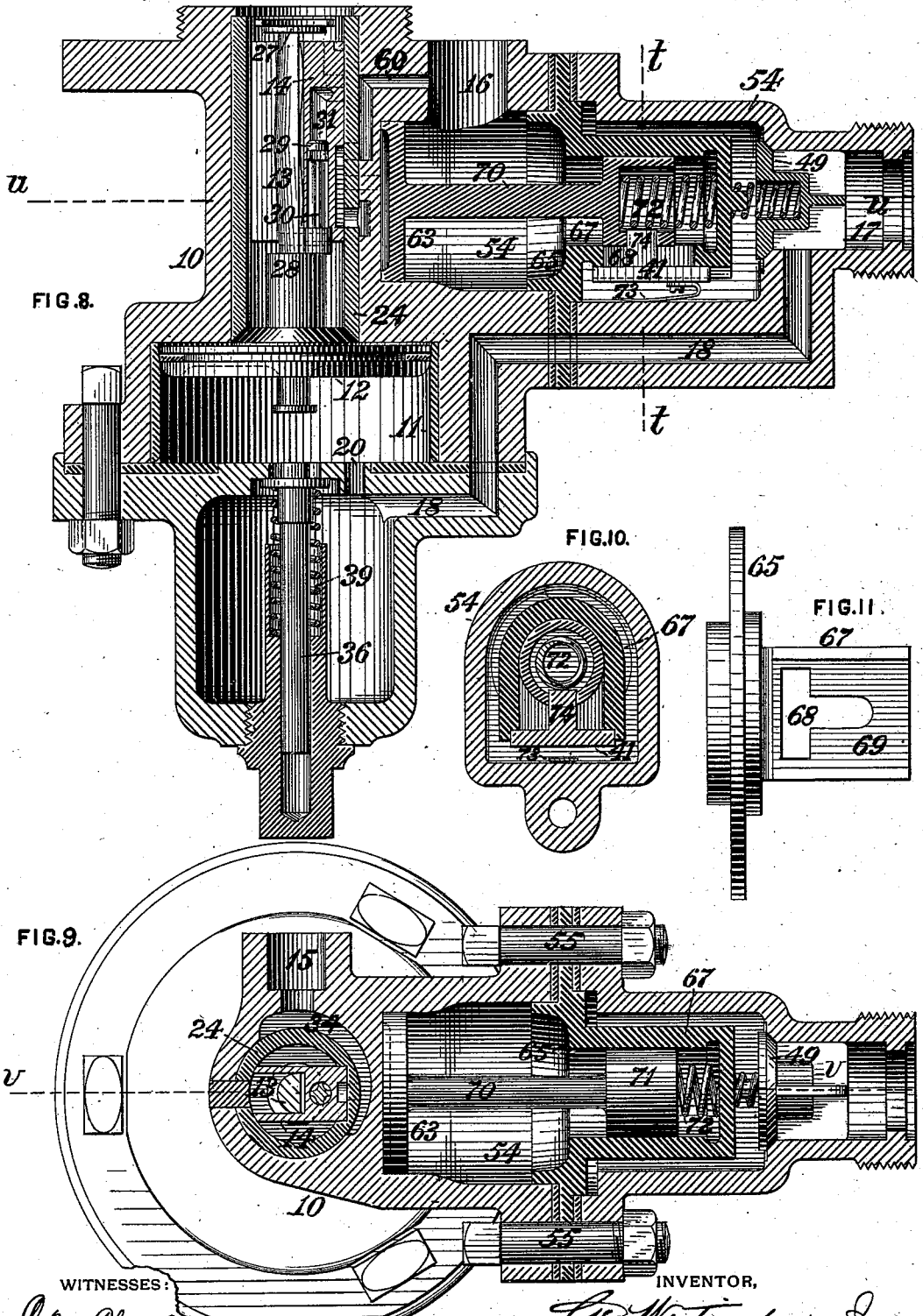

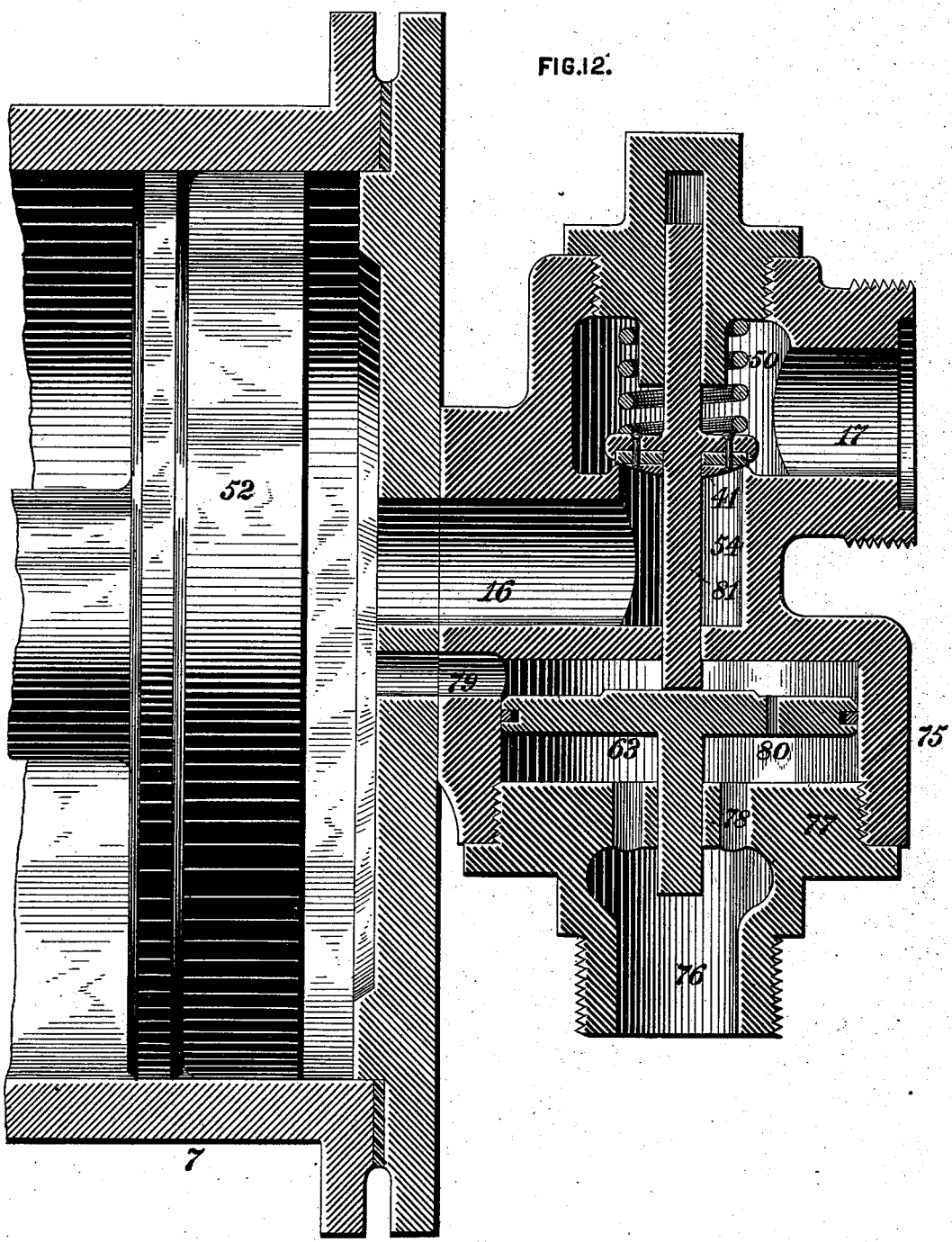

UNITED STATES PATENT OFFICE.

GEORGE WESTINGHOUSE, JR., OF PITTSBURG, PENNSYLVANIA.

FLUID-PRESSURE AUTOMATIC BRAKE MECHANISM.

SPECIFICATION forming part of Letters Patent No. 376,837, dated January 24, 1888.

Application filed October 1, 1887. Serial No. 251,195. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered certain new and useful Improvements in Fluid-Pressure Automatic Brake Mechanisms, of which improvements the following is a specification.

My present invention relates to appliances of the class exemplified in Letters Patent of the United States No. 360,070, granted and issued to me under date of March 29, 1887; and its object is to facilitate the application of brakes with great rapidity and full or approximately full force, as from time to time required, by the provision of means whereby the admission of air from the brake-pipe to the brake-cylinders may be effected as directly as practicable and through passages of as large capacity as may be desired.

The improvements claimed are hereinafter fully set forth.

In the accompanying drawings, Figure 1 is an inverted plan view of a portion of a railroad-car, illustrating the application of my invention; Fig. 2, a longitudinal section, on an enlarged scale, through a valve mechanism embodying my invention at the line *w w* of Fig. 3; Fig. 3, a transverse section through the same at the line *x x* of Fig. 2; Fig. 4, a top view of the main slide-valve; Figs. 5 and 6, transverse sections through the same at the lines *y y* and *z z*, respectively, of Fig. 4; Fig. 7, a longitudinal section through the main slide-valve bushing, taken parallel to the valve-face thereof; Fig. 8, a longitudinal section through a valve mechanism, illustrating a modification of my invention at the line *v v* of Fig. 9; Fig. 9, a transverse section through the same at the line *u u* of Fig. 8; Fig. 10, a similar section through the supplemental valve casing at the line *t t* of Fig. 8; Fig. 11, a view in elevation of the supplemental valve seat; and Fig. 12 a longitudinal central section through a valve mechanism, illustrating a further modification of my invention.

As shown in Figs. 1 to 7, inclusive, my invention is applied in connection with a "triple-valve" device which in general structure and manner of operation, and saving as to the improvements hereinafter described, accords substantially with those set forth in my Letters Patent No. 220,556, dated October 14, 1879, and No. 360,070, dated March 29, 1887. The operative mechanism of the triple valve proper is, as in said Letters Patent, inclosed within a case or chest, 10, which in this instance is secured to one end of the auxiliary reservoir 6, to the opposite end of which the brake-cylinder 7 is connected. The triple-valve case, auxiliary reservoir, and brake-cylinder are fixed in any convenient position on or under the sills or lower framing, 1, of the car, to which the main air or brake pipe 2, having the usual flexible connections and couplings, is likewise secured, and the brake-cylinder is fitted with a piston by the movements of which, through proper lever-connections, the brake-shoes are applied to and released from the wheels of the car.

The portion of the triple-valve case 10 which adjoins the auxiliary reservoir 6 is lined with an open-ended valve-bushing, 24, on which is formed the seat or valve face of the main slide-valve 14, the bushing 24 forming a chamber within which the valve is fitted to reciprocate, said chamber communicating at one end with the auxiliary reservoir and at the other with a bushing, 11, forming the chamber of a piston, 12, secured upon the stem 13 of the valve 14. A cap or drain-cup, 19, is secured upon the end of the valve-case 10, in which the bushing 11 is fixed, and communicates with the chamber inclosed by said bushing through a series of ports, 20. A supplemental valve-chamber, 54, is cast upon or secured to the triple-valve case 10 on one side of the valve-bushing 14, said chamber being preferably formed in two sections, as shown, the inner of which is cast upon the triple-valve case and provided with lugs to which the outer or cap section is secured by bolts 55. The chamber 54 communicates by a passage, 17, with the main air or brake pipe 2, and by a passage, 16, with the brake-cylinder 7, communication between the passages 16 and 17 being opened and closed as required in setting and releasing the brakes by interposed valves 41 and 49, as hereinafter described.

The valve-bushing 24 is provided with ports 56, 57, 58, and 59, all of which are governed by the main slide-valve 14. The port 56 communicates with a channel or passage, 60, leading into the brake-cylinder passage 16. The ports 57 and 58, which are located in line transversely in the bushing, communicate with passages 61, (indicated in dotted lines in Figs. 2 and 3,) leading into the supplemental valve-chamber 54, and the port 59 communicates with a channel, 34, leading to the relief or exhaust port 15. The main slide-valve 14 is provided with a longitudinal passage, 31, extending from its end adjacent to the piston 12 to a point on its face, said passage being governed by a graduating-valve, 29, secured upon a stem, 30, which is fixed to the valve-stem 13 and receives a limited degree of traverse independently of the main slide-valve 14 in order to open and close the passage 31. To this end the collar 27 and shoulder 28 of the valve-stem by which the valve 14 is moved are, as heretofore, set at a distance apart slightly greater than the length of the valve. A lateral port, 32, establishes communication between the valve-face end of the passage 31 and the interior of the bushing 24 and auxiliary reservoir 6 when the graduating-valve 29 is moved off its seat in the passage 31.

A lateral recess or cavity, 66, is formed in the face of the valve 14 adjacent to the opening of the passage 31, in position to register with the port 58 when brought in line therewith in the movements of the valve, and an exhaust recess or cavity, 62, which is widened at one end to extend over the openings of both the ports 57 and 58, is formed in the face of the valve 14 adjoining its opposite end. The exhaust-recess 62 serves in one position of the valve to establish communication between the brake-cylinder and the release-port 15 through the passages 60 and 34, and in another to put the bottom of the supplemental valve-chamber in communication with the release-port through the passages 61, 57, 58, and 59. A supplemental port or passage, 35, leads from the end of the valve 14 adjacent to the auxiliary reservoir to a point on the face of the valve so located that at the limit of the traverse of the valve-stem and valve 14 in the application of the brakes communication will be established between the auxiliary reservoir and the brake-cylinder through the passages 35, 60, and 16.

A supplemental piston, 63, which may be provided with a packing-ring, is fitted to traverse in the end of the supplemental valve-chamber 54 adjacent to the triple-valve case 10, and in its movement outwardly therefrom to bear against the stem 64 of a supplemental valve, 41, which opens outwardly or in the direction of the brake-pipe passage 17, and is seated upon and over an opening in a transverse partition, 65, interposed between the two sections of the valve-chamber 54. A check-valve, 49, which opens inwardly and is seated adjacent to the outer end of the valve-chamber 54, governs communication between the same and the passage 17, leading from the brake-pipe thereto. A spring, 50, bears at its ends upon the stems of the valves 41 and 49, and acts to hold the same to their respective seats during such periods as a substantial equilibrium of pressure is maintained in the brake-cylinder and brake-pipe and when the valve 41 is not subjected to pressure by the piston 63. The check-valve 49 may, if desired, be omitted, the supplemental valve 41 being in such case held to its seat by a spring sufficiently strong to retain within the brake-cylinder a sufficient pressure to stop the train in the event of a rupture of the brake-pipe or of the escape of air therefrom by the train breaking in two.

In operation the application of the brakes under such fraction of the maximum force as is required for making ordinary stops is effected, as in my prior constructions, by discharging a portion of the air from the brake-pipe through the engineer's valve, the preponderance of pressure thereby induced in the auxiliary reservoir moving the piston 12, stem 13, and main slide-valve 14 in the direction of the drain-cup 19 until such movement is arrested by the decrease of pressure in the auxiliary reservoir or by the tension of the spring 39 on the stem 36, against which the stem 13 abuts. The graduating-valve 29 having been meanwhile unseated by the movement of the stem, compressed air from the auxiliary reservoir passes through the port 32, passage 31, passage 60, (with which in this position of the valve 14 the passage 31 communicates,) and passage 16 to the brake-cylinder 6, forcing out the piston thereof and through the usual connections applying the brakes.

In making emergency stops, or when it is desired to apply the brakes with the greatest rapidity and greatest available force, sufficient air is discharged by the engineer to effect a sudden and material reduction of pressure—as, say, twenty pounds per square inch—in the brake-pipe, the effect of which is to force the piston 12 and main slide-valve 14 to the extreme limit of their stroke in the direction of the drain-cup 19. When in such position, the port 58 of the valve-bushing 24 will be opened by the valve-recess 66 and the port 57 by the port 32 and passage 31, permitting the passage of air from the auxiliary reservoir through the ports 57 and 58 and communicating passages 61 to the supplemental valve-chamber 54 on the inner side of its piston 63. The pressure thereby exerted upon the piston 63 forces the latter outwardly, its bearing in its outward movement upon the stem 64 of the supplemental valve 41 raising the latter from its seat, upon which the preponderance of pressure in the brake-pipe and connected passage 17 opens the check-valve 49 and admits air directly from the brake-pipe to the brake-cylinder through the passage 17, chamber 54, and passage 16.

It will be observed that the passages 17 and 16 may be made of as large diameter as desired without interfering with other portions of the mechanism, and that the traverse of the air from the brake-pipe to the brake-cylinder is comparatively short and direct. When the main slide 14 has been brought into position to effect the admission of air from the brake-pipe to the brake-cylinder, as above described, its port 35 is in communication with the ports 56 and 60 and the pressure theretofore exerted in the brake-cylinder is augmented by that existing in the auxiliary reservoir, the air from which passes to the brake-cylinder through the ports 35, 56, and 60. Upon the reduction of pressure in the brake-pipe below that in the brake-cylinder the check-valve 49 is seated by the higher pressure on its inner side and by the spring 50, or, if equilibrium of pressure exists in the brake-pipe and brake-cylinder, by the spring 50, thereby preventing the return of air from the brake-cylinder to the brake-pipe.

In releasing the brakes the pressure in the brake-pipe is reinstated by the admission of air from the main reservoir, when the increased pressure, acting through the passage 17 and 18 and openings 20 upon the adjacent side of the piston 12, forces the latter and the connected main slide-valve 14 in the opposite direction, the first effect of which movement is to open the ports 61, 57, and 58 to the release-port 15 through the exhaust-cavity 62 of the valve 14, when the piston 63 is moved inwardly by the pressure upon its outer side, releasing the supplemental valve 41, which, together with the check-valve 49, is seated by the spring 50, thereby closing communication between the brake-pipe and brake-cylinder. The further movement of the valve 14 opens the passage 60 to the exhaust through the recess 62 and allows the air to escape from the brake-cylinder through said passage and recess, when the piston of the brake-cylinder is returned to its original position by a spring, releasing the brake-shoes in its backward movement. The auxiliary reservoir is recharged, as heretofore, by air which passes through a small feeding groove in the chamber of the piston 12.

Figs. 8 to 11 show a modification in which a different form of supplemental valve is employed, the same being of the slide instead of the puppet type, as in the case first described. In this instance a central chamber, 67, is formed upon the partition or division plate 65 of the supplemental valve-chamber 54, the chamber 67 being open at its inner end to the section of the chamber 54 which is provided with the brake-cylinder passage 16, and communicating by a lateral port or opening, 68, formed in a valve face or seat, 69, on its side, with the outer section of the chamber 54, or that into which the brake-pipe passage 17 leads. The stem 70 of the piston 63 is prolonged to extend into the chamber 67, and carries a head, 71, fitting therein. A spring, 72, which bears against the head 71 and the end wall of the chamber 67, maintains the piston 63 at the inner extremity of its traverse, except when the piston is moved by the pressure of air admitted through the ports 61, as previously described. The supplemental valve 41 is a flat slide, which works on the valve-face 69, and is held to a proper bearing thereon by a spring, 73. The valve 41 is reciprocated to open and close, as required, the port 68 by the piston 63, a projection, 74, on the valve, which traverses in a longitudinal extension of the port 68, engaging a recess in the side of the head 71 of the piston-stem 70. A check-valve, 49, which opens inwardly and is seated by a spring, 50, is fitted to seat in the outer end of the chamber 54, and controls communication between the chamber 54 and brake-pipe passage 17. The operation is similar to that first described, the supplemental valve 41 being moved to open the port 68 by the piston 63 on the application of pressure to the latter from the auxiliary reservoir through the ports 57, 58, and 61 in the movement of the main slide-valve 14, and the check-valve 49 being thereupon opened by the pressure of air in the brake-pipe and passage 17 and admitting the same to the chamber 54 and brake-cylinder passage 16.

Another modification of my invention (shown in Fig. 12) is designed for use in connection with the ordinary or any desired form of triple valve for the purpose, as in the previous instances, of effecting quick and powerful action when required. The supply of air from the auxiliary reservoir and triple valve to the brake-cylinder 7 in the application of the brake, and its exhaust from the brake-cylinder in their release, is in this case effected through a piston-chamber, 75, which communicates with the triple valve by a passage, 76, formed on or fixed to its head or end plate, 77, and by ports or openings 78, leading out of said passage and through the head 77. The opposite end of the piston-chamber 75 communicates with the brake-cylinder by a passage, 79, and a piston, 63, is fitted to work in the chamber between the ports 78 and passage 79. A port, 80, extends through the piston 63, said port being of a diameter not exceeding that which will suffice to admit and exhaust air to and from the brake-cylinder in ordinary braking—that is to say, where full braking power is not desired to be exerted—so that in such case the air may pass directly to the piston of the brake-cylinder without moving the piston 63, while the sudden admission of a greater volume of air will impart movement to the piston. A valve-chamber, 54, which is connected or adjacent to the piston-chamber 75, communicates with the brake-cylinder 7 by a passage, 16, and with the main air-brake pipe by a passage, 17, communication between said passages being governed by a supplemental valve, 41, which opens outwardly or in the direction of the brake-pipe passage 17, and is normally seated by a spring, 50. The valve 41 is fixed upon a stem, 81, which extends into the piston-chamber 75 and bears at its end upon the piston thereof. The passage 17 may be provided with an ordinary check-valve opening inwardly to prevent the return of air from the brake-cylinder on a diminution of the pressure in the brake-pipe below that in the brake-cylinder.

In ordinary braking, air from the auxiliary reservoir and triple valve passes through the passage 76, ports 78, piston-chamber 75, and ports 80 and 79 into the brake-cylinder to effect the application of the brakes, and is similarly discharged to the exhaust in their release. When the brakes are to be applied quickly and with full force, a greater quantity of air is suddenly admitted to the piston-chamber 75, and, not finding sufficient discharge through the port 80, moves the piston 63 in the direction of the valve 41, and through the stem 81, unseats said valve and admits air directly to the brake-cylinder from the brake-pipe through the passages 17 and 16 and chamber 54, as in the instances before described. In the release of the brakes the valve 41 is seated by the spring 50.

I claim as my invention and desire to secure by Letters Patent—

1. In a brake mechanism, the combination of a chamber or casing having direct connections to a brake-cylinder and to a brake-pipe, respectively, a valve controlling communication between said connections, and a piston or diaphragm which is independent of and unconnected with a triple-valve piston and is actuated by pressure from an auxiliary reservoir in direction to impart opening movement to said valve, substantially as set forth.

2. In a brake mechanism, the combination of a chamber or casing having direct connections to a brake-cylinder and to a brake-pipe, respectively, a valve controlling communication between said connections, a piston or diaphragm which is independent of and unconnected with a triple-valve piston and is actuated by pressure from an auxiliary reservoir in direction to impart opening movement to said valve, and a check or non-return valve controlling communication between said valve and the brake-pipe passage of the chamber, substantially as set forth.

3. In a brake mechanism, the combination, with a triple valve, of a supplemental chamber or casing having passages leading to a brake-cylinder and to a brake-pipe, respectively, a supplemental valve controlling communication between said passages, a supplemental piston operating independently of the triple-valve piston and adapted to impart opening movement to said supplemental valve, and a passage establishing communication between said supplemental piston and an auxiliary reservoir, substantially as set forth.

4. In a brake mechanism, the combination, with a triple valve, of a supplemental chamber or casing having passages leading to a brake-cylinder and to a brake-pipe, respectively, a supplemental valve controlling communication between said passages, a piston adapted to impart movement to said valve, and a passage establishing communication between said piston and an auxiliary reservoir through the main slide-valve of the triple-valve mechanism, substantially as set forth.

5. In a brake mechanism, the combination of a triple valve having its main slide-valve and valve-bushing provided with ports and passages for the admission and exhaust of air from an auxiliary reservoir to and from a brake-cylinder and to and from a supplemental valve-chamber, a supplemental valve-chamber connected to the slide-valve chamber of the triple valve and having passages leading to the brake-cylinder and to the brake-pipe, respectively, a supplemental valve governing a port or opening in a partition of said chamber between said passages, a piston fitting said chamber above a port leading to the main slide-valve chamber in position to impart movement to the supplemental valve, a check-valve governing the brake-pipe passage of the supplemental valve-chamber, and a spring or springs acting to seat the supplemental and check valves, substantially as set forth.

6. In a brake mechanism, the combination of a triple-valve casing, a supplemental valve-chamber composed of an inner section which is formed integral with the triple-valve casing and a separable outer section, each having a lateral air pipe or passage, and a supplemental valve-seat formed in a division plate or partition interposed between and secured to the two sections of the supplemental valve chamber, substantially as set forth.

In testimony whereof I have hereunto set my hand.

GEO. WESTINGHOUSE, JR.

Witnesses:
  J. SNOWDEN BELL,
  W. D. UPTEGRAFF.